Dec. 12, 1933.  R. E. PALMER  1,939,223
FAIRING STRIP ATTACHING MEANS
Filed July 29, 1932
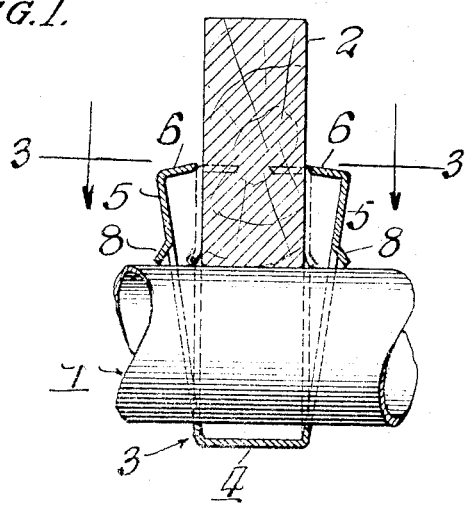
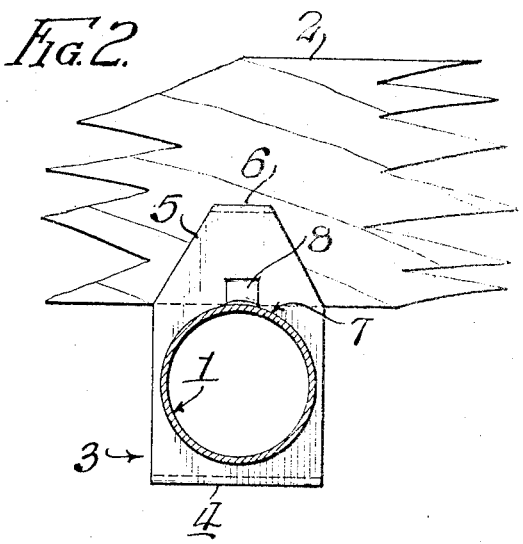
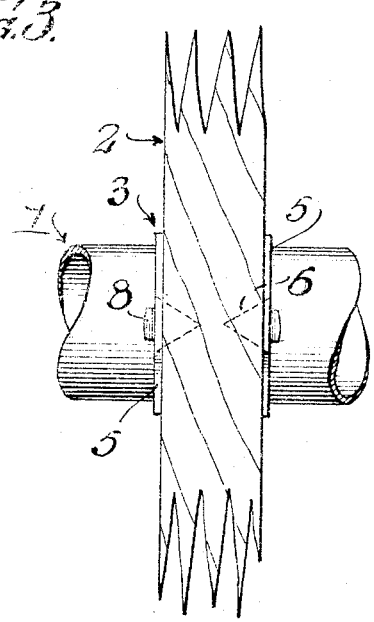
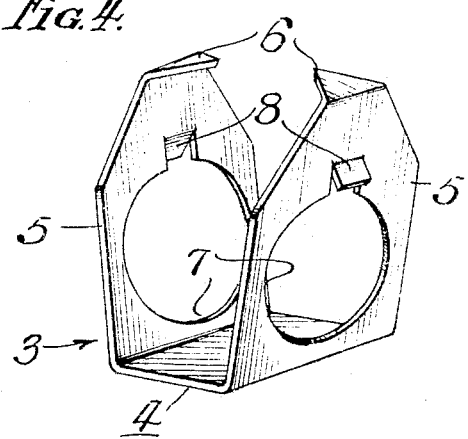
Inventor:
R. E. PALMER
By: Arthur Wm Nelson
Atty.

Patented Dec. 12, 1933

1,939,223

UNITED STATES PATENT OFFICE 1,939,223

FAIRING STRIP ATTACHING MEANS

Richard E. Palmer, Kenmore, N. Y., assignor to Manning & Co., Chicago, Ill., a corporation of Illinois Application July 29, 1932. Serial No. 625,614

6 Claims. (Cl. 189—35)

This invention relates to improvements in fairing strip attaching means, and it consists of the matters hereinafter described and more particularly pointed out in the appended claims.

The primary object of the invention is to provide simple and efficient means especially adapted for use in aircraft production, for attaching a wooden or like fairing strip to an associated metallic structural member without the necessity of welding operations or securing devices such as bolts or rivets.

Another object of the invention is to provide a means of this kind including a fairing strip receiving clip so formed as to be longitudinally movable along the structural member for positioning and then locked thereon by means of integral bendable jaws and which jaws insure against accidental or other shifting of the clip upon said member.

Still a further object of the invention is to provide a means of this kind, including spaced fingers through which the structural member extends and which fingers each have a prong for penetration into opopsite side of the associated fairing strip, as well as parts bendable into a binding engagement with said structural member to lock the parts in position.

The above mentioned objects of the invention, as well as others, together with the many advantages thereof, will more fully appear as I proceed with my specification.

In the drawing:

Fig. 1 is a view in end elevation of the improved means as when employed in attaching a wooden fairing member to a metallic structural member to form a part of an aircraft assembly.

Fig. 2 is a view in side elevation of the parts shown in Fig. 1.

Fig. 3 is a horizontal detail sectional view through the parts shown in Fig. 1 as taken on the line 3—3 thereof.

Fig. 4 is a perspective view of a certain metallic clip forming a part of the improved attaching means.

In aircraft production work it is often necessary to attach wooden or like members to a metallic structural member. As such structural members generally constitue thin metallic tubing, the use of bolts or rivets as attaching means is impractical because of the holes required in such structural members and which materially weakens the same. Again, in many instances it is difficult to locate such holes exactly in said members with respect to the position in which it is desired to locate the associated fairing strip.

In the present invention a clip of peculiar, though simple construction, is employed and which constitutes two laterally spaced fingers connected together at one end and having inwardly extending prongs at the other end for penetration into opposite sides of the fairing strip. Said fingers have registering holes therein, each of a diameter approximating that of the structural member which extends therethrough and a part of each finger adjacent each hole is made to provide a lug or wedge deformable for locking the clip in place upon said structural member.

In attaching a fairing strip in a position at a right angle to the structural member, the clip with its fingers spaced apart a distance permitting the insertion of a fairing strip between their prongs, is slid or moved along said structural member into the position to be occupied by the fairing strip. After the fairing strip has been engaged between said fingers with its edge resting upon the structural member, the fingers are squeezed toward each other into engagement with opposite sides of the fairing strip and during this squeezing of the fingers, the prongs thereof penetrate into the fairing strip. Thereafter any suitable tool is used to deform the lugs or wedge of each finger into tight wedging engagement with the external surface of the structural member and thus the clip is not only secured to the structural member but also to the fairing strip to attach the two rigidly together against accidental displacement in any direction.

Referring now in detail to that embodiment of the invention, illustrated in the drawing, 1 indicates as a whole one of the structural members of an aircraft. Ordinarily such a structural member constitutes a light gage metallic tube and one preferably of a cylindrical cross section.

2 indicates as a whole a wooden member such as a fairing strip which it is desired to attach to said structural member so as to extend in a direction at a right angle thereto. Such a fairing strip is usually of a rectangular cross section with the grain running longitudinally thereof.

3 indicates as a whole one form of a clip by means of which the attachment is made between said structural member and fairing strip and which clip is best shown in perspective in Fig. 4.

Said clip which is made from a piece of suitably formed and folded sheet metal includes a base 4 with an upstanding finger or wall 5 at each side thereof and each finger or wall terminates at its free end in a triangularly shaped or pointed prong 6 which normally overhangs the base which is substantially as wide as the fairing strip. In making up the clip, the outer ends of the fingers or side walls are tapered to a point and the pointed ends are bent over and inward along suitable fold lines to provide the prongs.

In each finger or side wall is provided an opening 7 of a diameter substantially equal to that of the structural member with which the clip is to be used for its intended purpose and in the median line of each finger adjacent the hole, is formed an outwardly directed deformable lip or wedge 8.

In the assembly of the parts, one or more clips is disposed upon the structural member which extends through the holes 7 in the fingers or walls of each clip.

The clip is then slid along the structural member to the position in which it is desired to attach a fairing strip thereto. In the normal condition, the fingers or side walls are spread apart a distance to permit the insertion of a fairing strip between the prongs thereof so that the bottom edge of the fairing strip rests directly upon the structural member as best shown in full lines in Fig. 1. With any suitable tool, the two fingers or side walls are squeezed in toward each other and in this movement of said fingers or walls, the prongs 6 penetrate into the opposite sides of the fairing strip as best shown in dotted lines in Fig. 1. This penetration is a comparatively easy matter because it will be noticed that the prongs are disposed longitudinally of the fairing strip and are therefore, parallel with the grain thereof.

When the fingers have thus been squeezed into place, they will engage flat against the sides of the fairing strip after which the lips or wedges 8 are straighten out by means of any suitable tool to wedge in against the associated surface parts of the structural member in a manner absolutely locking the clip against any endwise or turning movement upon the structural member.

Thus the fairing strip is held against any shifting or other movement with respect to the structural member and is also held against any twisting movement relative thereto by the relative short top parts of the fingers that are quite rigid.

By the use of the clip, no holes need be produced in the structural member with attending weakening effect and no nails or screws need be employed and thus a strong but light weight attachment is provided between the structural member and fairly strip. Again, the clip may be easily moved along the structural member for spotting or locating the same with reference to the position the fairing strip is to be attached thereto.

While in describing the invention, I have referred in detail to the form and arrangement of the parts, the same is to be considered merely as illustrative of the preferred form of the invention, so that I do not wish to be limited thereto except as may be specifically set forth in the appended claims.

I claim as my invention:

1. In combination with a structural member, means providing upstanding laterally spaced fingers connected together at one end for a simultaneous adjustable movement upon said structural member without removal therefrom in a direction other than that parallel with said structural member, and a fairing strip disposed between and operatively connected to the other end of said fingers, portions of which fingers are deformable to fix them against movement in any direction with respect to said structural member.

2. In combination with a structural member, a clip comprising two upstanding laterally spaced fingers connected together at one end and each surrounding said structural member but longitudinally adjustable thereon, and a fairing strip disposed between and operatively connected to the other ends of said fingers, portions of which fingers are made to be deformed into a wedging binding engagement with associated portions of said structural member.

3. In combination with a structural member, a clip comprising two upstanding laterally spaced fingers connected together at one end and each having an opening therein, through which said structural member extends whereby said clip may be moved along said structural member into the desired position thereon and a fairing strip disposed between and operatively connected to the other ends of said fingers, portions of which fingers are made to be deformed into a wedging binding engagement with associated portions of said structural member.

4. In combination with a structural member, a clip comprising two upstanding laterally spaced fingers connected together at one end and each surrounding said structural member but longitudinally adjustable thereon and a fairing strip disposed between the other ends of said fingers and engaged upon said structural member and which last mentioned ends of said fingers are provided with prongs penetrating into said fairing strip, and lips integral with portions of said fingers adjacent said holes adapted to be deformed into a wedging binding engagement upon said structural member.

5. In a fairing strip attaching means, a clip comprising two laterally spaced fingers connected together at one end and each having an opening therein to receive an associated structural member, a portion of each finger being formed to provide a deformable lip associated with the opening therein.

6. In a fairing strip attaching means, a clip comprising two laterally spaced fingers connected together at one end and each having an inwardly extending prong at the other end, each finger having an opening therein for receiving an associated structural member, a portion of each finger being formed to provide a lip associated with the opening therein for deformation into locking engagement with said structural member.

RICHARD E. PALMER.